(12) United States Patent
Wilson

(10) Patent No.: US 8,275,662 B2
(45) Date of Patent: Sep. 25, 2012

(54) METHOD AND APPARATUS FOR GENERATING GEO-TARGETED MESSAGE WITH SEARCH RESULTS

(75) Inventor: Don David Wilson, Oxnard, CA (US)

(73) Assignee: Francap Corporation, Oxnard, CA (US)

( * ) Notice: Subject to any disclaimer, the term of this patent is extended or adjusted under 35 U.S.C. 154(b) by 256 days.

(21) Appl. No.: 11/931,384

(22) Filed: Oct. 31, 2007

(65) Prior Publication Data

US 2008/0177847 A1    Jul. 24, 2008

Related U.S. Application Data

(60) Provisional application No. 60/881,184, filed on Jan. 19, 2007.

(51) Int. Cl.
*G06Q 30/00* (2012.01)
(52) U.S. Cl. .................................. 705/14.54; 705/14.66
(58) Field of Classification Search ............... 705/14.54, 705/14.66
See application file for complete search history.

(56) References Cited

U.S. PATENT DOCUMENTS

| | | | |
|---|---|---|---|
| 5,764,906 A | | 6/1998 | Edelstein et al. |
| 6,101,537 A | | 8/2000 | Edelstein et al. |
| 7,035,812 B2 * | | 4/2006 | Meisel et al. ................... 705/14 |
| 2001/0051911 A1 | | 12/2001 | Marks et al. |
| 2003/0050863 A1 * | | 3/2003 | Radwin ......................... 705/27 |
| 2003/0083937 A1 | | 5/2003 | Hasegawa et al. |
| 2004/0243470 A1 * | | 12/2004 | Ozer et al. ..................... 705/14 |
| 2005/0137939 A1 | | 6/2005 | Calabria et al. |
| 2005/0144068 A1 | | 6/2005 | Calabria et al. |
| 2005/0149390 A1 | | 7/2005 | Scholl et al. |
| 2005/0187823 A1 | | 8/2005 | Howes |
| 2005/0256766 A1 | | 11/2005 | Garcia et al. |
| 2006/0026067 A1 * | | 2/2006 | Nicholas et al. ................. 705/14 |
| 2006/0155609 A1 | | 7/2006 | Caiafa |
| 2006/0212447 A1 * | | 9/2006 | Davis et al. ....................... 707/6 |
| 2007/0088603 A1 * | | 4/2007 | Jouppi et al. ................... 705/14 |

FOREIGN PATENT DOCUMENTS

| | | |
|---|---|---|
| EP | 0889421 | 1/1999 |
| JP | 2005037779 | 2/2005 |
| WO | WO 9721183 | 6/1997 |

(Continued)

OTHER PUBLICATIONS

Baertlein, L., "Google Seeks to Broaden Ad Reach to More Companies," Reuters, Feb. 10, 2005, <http://massis.lcs.mit.edu/telecom-archives/TELECOM_Digest_Online2005-1/2374.html >.

(Continued)

*Primary Examiner* — Daniel Sorkowitz
(74) *Attorney, Agent, or Firm* — Roylance, Abrams, Berdo & Goodman, LLP

(57) ABSTRACT

Method and apparatus for generating a geo-targeted message with search results are disclosed. The method and apparatus allow client entities to present target messages to computer user recipients by providing geo-targeted messaging that provides search results to computer users along with a geo-targeted message. Client entities lease words based on specified geo-target criteria on specified platforms. Users initialize the apparatus and can perform word searches utilizing the method and apparatus where the word may be a client's leased word that is associated to the user's geographic profile. Thus, the user is provided a geo-targeted message along with search results and the client is able to effectively communicate a message to targeted recipients.

23 Claims, 12 Drawing Sheets

FOREIGN PATENT DOCUMENTS

| | | |
|---|---|---|
| WO | WO 2005050344 | 6/2005 |
| WO | WO 2007023321 | 3/2007 |

OTHER PUBLICATIONS

Delaney, K., "Google Profit Soars on Ad Strength," *Wall Street Journal*, Feb. 2, 2005.

Delaney, K., "Yahoo's Profit Surges Amid Ad Boom," *Wall Street Journal*, Jan. 19, 2005.

Francisco, B., "Niche Sites are Moving Into Prime Time," *CBS MarketWatch*, Nov. 2, 2004, 12:22 am.

Francisco, B., "EBay vs. Google: Who's controlling the Web today?," *CBS MarketWatch*, Feb. 8, 2005.

Francisco, B., "Online Ad Dollars Leap 10 to 1.5," *CBS MarketWatch*, Nov. 16, 2004, 12:01 am.

Francisco, B., "Think about Hedging Your Net Bets in 2005," *CBS MarketWatch*, Dec. 21, 2004, 12:01 am.

Gillmor, D., "Is Google stock worth that sky-high premium?," Nov. 3, 2004.

Mangalindan, M., "Could Web Sales' Boom Leave Amazon Behind?," *Wall Street Journal*, Jan. 21, 2005.

\* cited by examiner

ZIP CODE LEVEL ORDER FOR AN ADVERTISER CLIENT

ZIP CODE LEVEL GEO-TARGETING - SELECTION INTERFACE, ALONG WITH POPULATION

NETWORD PURCHASE AVAILABILITY AND PRICING IN A GEO-TARGET

⊖ Available    ⊕ Lease Pending    ⊞ Leased

| Zip Code | City | State | Population | Price |
|---|---|---|---|---|
| 12302 | Schenectady | NY | 27001 | ⊖ $2450.00 |
| 12304 | Schenectady | NY | 20969 | ⊖ $1800.00 |
| 12306 | Schenectady | NY | 24581 | ⊖ $2450.00 |
| Total sum: | | | 72551 | $6700.00 |

FIG. 2c

SUMMARY OF NETWORD PURCHASE ORDER FOR AN ADVERTISER CLIENT

Netword

ORDER #3773
12/23/2005

RABBIT MARKETING
Black Rock NM 87327
PHONE:
FAX:

NETWORD ORDER STATUS

| # | Netword | Platforms | Geotargets | URLs | Price | Total |
|---|---|---|---|---|---|---|
| 1 | Cartagena | ask, aol, altavista, google, highbeam, information, infospace, lycos, msn, myway, netscape, urlbar, websearch, yahoo | {W} | http://www.drugwars.com | $3705.09 | $3705.09 |

Order Status: completed

Unless otherwise indicated herein, the Netword(s) above listed is (are) being leased for a one year term commencing on the date of

FIG. 3

NETWORD PLUG-IN TOOLBAR FOR A USER

NETWORD SETUP WINDOW

| Agent Setup | | ☒ |
|---|---|---|
| Postal Code | 90210 | OK |
| Country Code | us | Cancel |
| Distance | 5  mi | |
| Language | en | |

RESULT TO USER

Google [auto upholsterer]

Did you mean auto *upholstery*

Auto Upholstery Instruction Auto Trim

How To Upholster, Upholstery Instruction, Reupholstery Classes...

An's Auto Upholstery auto upholstery kits auto carpet kits; auto carpet, auto carpet...

Job Guide 2007 - Job Details

Upholstery Supplies, Upholstery Fabrics, Upholstery Foam For....

Contract fabric

Car and Truck Upholstery

Auto Fabric

Custom Leather Interiors

Upholsterer

Auto Upholstery

Auto Interior

Discount Fabric

JOEY M'S UPHOLSTERERS

PRINT AND CUT THIS COUPON!!!

SAVE $50 OR 10%, THE GREATER

ON ANY HEADLINER INSTALLATION, FULL CARPET REPLACEMENT.
FRONT AND REAR SEAT REUPHOLSTERY, OR; LEFT AND RIGHT SIDE DOOR PANEL REPLACEMENT.
Phone. (805) 484-8424
BY APPOINTMENT ONLY

FIG. 13

METHOD AND APPARATUS FOR GENERATING GEO-TARGETED MESSAGE WITH SEARCH RESULTS

CROSS-REFERENCE TO RELATED APPLICATIONS

This application claims the benefit under 35 U.S.C. §119 (e) of U.S. Provisional Patent Application No. 60/881,184, filed on Jan. 19, 2007, in the U.S. Patent and Trademark Office, the entire disclosure of which is hereby incorporated by reference.

TECHNICAL FIELD

The present invention relates to a method and apparatus for generating a geo-targeted message with search results.

BACKGROUND OF THE INVENTION

Many search engine services, such as Google and Yahoo, provide for searching for information that is accessible via the Internet. These search engine services allow users to search for web pages and other Internet accessible resources that may be of interest to users.

Generally, an entity ("client", including an advertiser) would like to maximize the effectiveness of communication (such as advertisements) to potential recipients (including computer and/or internet users), placed along with search results. For examples, advertisers try to identify search term and advertisement combinations that result in the highest benefits (for example, most profit) to the advertiser.

SUMMARY OF THE INVENTION

Accordingly, an aspect of exemplary embodiments of the present invention is to provide geo-targeted internet messaging that would allow entities to better target messages to recipients to maximize the effectiveness of the communication.

An exemplary embodiment of the present invention is to provide geo-targeted internet messaging that provides search results to computer users along with a geo-targeted message and provides leased words to entities.

An exemplary embodiment of the present invention provides a method for providing geo-targeted internet messages, the method comprising providing a toolbar plug-in for an electronic document for allowing a user to enter a keyword, customizing the toolbar plug-in with at least one geographical setting, providing exclusive leasing rights to a client to use a word for communicating a message, wherein the word exclusively corresponds to at least one geo-targeted area, saving the word provided by the advertiser as a leased word, receiving a keyword from a user for a search request, determining if the keyword matches a leased word, displaying a search result for the keyword, and displaying a message corresponding to the leased word, if the keyword received from a user matches the leased word.

An aspect of exemplary embodiments of the present invention is to provide a method for providing exclusive rights to use of a leased word, the method comprising receiving a word from a client for leasing, receiving a URL from the client for associating with the word if the client provides a link to associate with the message, presenting a plurality of available geo-target areas to a client, wherein the client can select at least one geo-target area for associating with the word, receiving at least one selected geo-target from the client, presenting one or more platforms to the client for capturing user's searching for a keyword, determining the clients' platform(s) and associating the platform(s) with the word, calculating a pricing structure for leasing the word associated with the selected geo-target areas, determining the availability status of the word, wherein the availability status is either available, lease pending or leased, for the selected geo-target area, displaying the availability status and a price structure of the word associated with the selected geo-target areas, displaying a purchase order status to an advertiser for the word associated with the selected geo-target areas, receiving a purchase order from a client for leasing the available word in the selected geo-target area, storing a relationship for the leased word with the selected geo-target areas and updating the availability status of the leased word.

An exemplary embodiment of the present invention is to provide A computer readable medium having stored thereon executable instructions for providing geo-targeted internet messages, the instructions comprising a first set of instructions for providing a toolbar plug-in for an electronic document for allowing a user to enter a keyword, a second set of instructions for customizing the toolbar plug-in with at least one geographical setting, a third set of instructions for providing exclusive leasing rights to a client to use a word for communicating a message, wherein the word exclusively corresponds to at least one geo-targeted area, a fourth set of instructions for saving the word provided by the advertiser as a leased word, a fifth set of instructions for receiving a keyword from a user for a search request, a sixth set of instructions for determining if the keyword matches a leased word, a seventh set of instructions for displaying a search result for the keyword, and an eighth set of instructions for displaying a message corresponding to the leased word, if the keyword received from a user matches the leased word.

An exemplary embodiment of the present invention is to provide a computer readable medium having stored thereon executable instructions for providing exclusive rights to use of a leased word, the method comprising a first set of instructions for receiving a word from a client for leasing, a second set of instructions for receiving a URL from the client for associating with the word if the client provides a link to associate with the message, a third set of instructions for presenting a plurality of available geo-target areas to a client, wherein the client can select at least one geo-target area for associating with the word, a fourth set of instructions for receiving at least one selected geo-target from the client, a fifth set of instructions for presenting one or more platforms to the client for capturing user's searching for a keyword, a sixth set of instructions for determining the clients' platform(s) and associating the platform(s) with the word, a seventh set of instructions for calculating a pricing structure for leasing the word associated with the selected geo-target areas, an eighth set of instructions for determining the availability status of the word, wherein the availability status is either available, lease pending or leased, for the selected geo-target area, a ninth set of instructions for displaying the availability status and a price structure of the word associated with the selected geo-target areas, a tenth set of instructions for displaying a purchase order status to an advertiser for the word associated with the selected geo-target areas, an eleventh set of instructions for receiving a purchase order from a client for leasing the available word in the selected geo-target area, a twelfth set of instructions for storing a relationship for the leased word with the selected geo-target areas, and a thirteenth updating the availability status of the leased word.

An exemplary embodiment of the present invention is to provide a method for providing internet message to users comprising providing a clients' message to a user based on user's geographic information, along with providing search results for a user's query of a word, and providing exclusive rights to the clients to use a word associated with a geo-targeted area, wherein the geo-targeted area includes at least one of national, state, regional and zip code level geo-targeting.

Other objects, advantages and salient features of the invention will become apparent to those skilled in the art from the details provided, which, taken in conjunction with the annexed drawings, disclose exemplary embodiments of the invention.

BRIEF DESCRIPTION OF THE DRAWINGS

The above and other aspects, features and advantages of the certain exemplary embodiments of present invention will be more apparent from the following detailed description when taken in conjunction with the accompanying drawings, in which:

FIG. 2c) is a computer generated display that shows the availability of a keyword/leased word in a geo-target along with the cost of purchase for that option, according to an exemplary embodiment of the present invention.

FIG. 3) is a computer generated display showing a leased word purchase order for an advertiser client, according to an exemplary embodiment of the present invention.

FIG. 13) illustrates a computer generated display of a resolved web page presented to a user after user has entered a keyword/leased word to provide the user with a unique screen view giving an advertiser client's advertisement in a separate browser window, without a link, than the search result for the keyword, according to an exemplary embodiment of the present invention.

Throughout the drawings, like reference numerals will be understood to refer to like elements, features and structures

DETAILED DESCRIPTION OF EXEMPLARY EMBODIMENTS

The matters exemplified in this description are provided to assist in a comprehensive understanding of exemplary embodiments of the invention. Accordingly, those of ordinary skill in the art will recognize that various changes and modifications of the embodiments described herein can be made without departing from the scope and spirit of the claimed invention. Also, descriptions of well-known functions and constructions are omitted for clarity and conciseness.

Figures 1A, 1B:
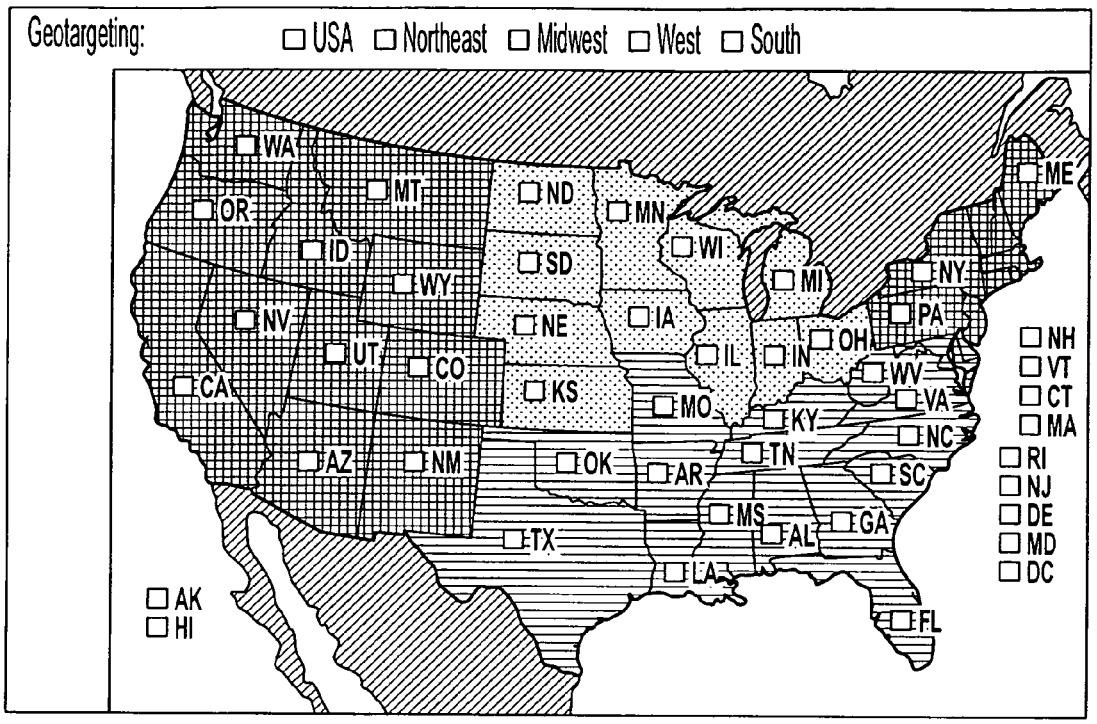
FIG. 1a) is a computer generated display showing a geo-target selection interface for U.S. National, Region, and State level options for an advertiser client according to an exemplary embodiment of the present invention.
FIG. 1b) is a computer generated display showing State/Region geo-target level ordering option for a client that associates a keyword/leased word with its destination URL (effectively, an advertisement) with various Internet search engines and/or e-commerce web sites, according to an exemplary embodiment of the present invention.
Figure 2A:
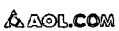
FIG. 2a) is a computer generated display that shows zip-code level geo-target ordering option for an advertiser client that associates a keyword/leased word with its destination URL (advertisement) with various Internet search engines and/or e-commerce web sites, according to an exemplary embodiment of the present invention.
Figure 6:
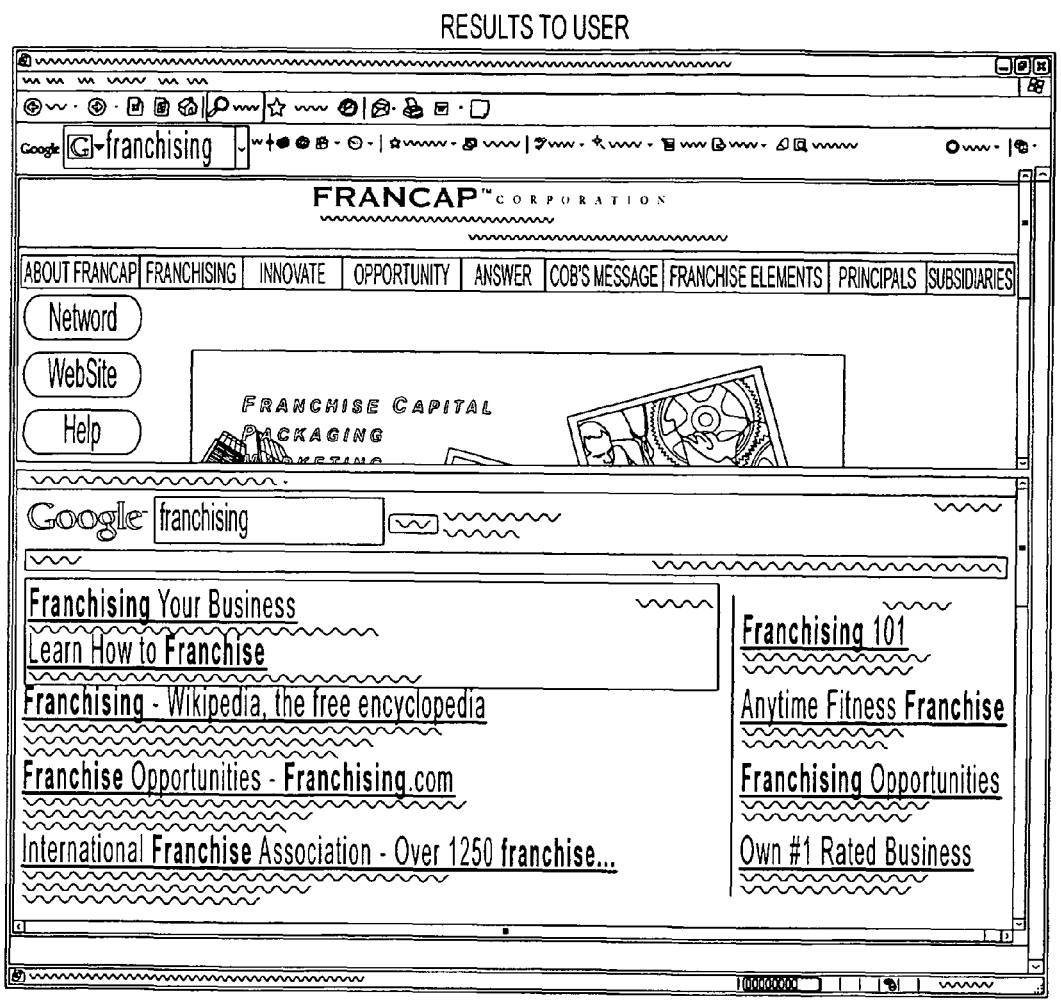
FIG. 6) illustrates a computer generated display of a resolved web page presented to a User after User has entered a keyword word to provide the user with a unique screen view giving an advertiser client's advertisement in a separate window above the search result for the keyword on the bottom, according to an exemplary embodiment of the present invention.
Figure 7:
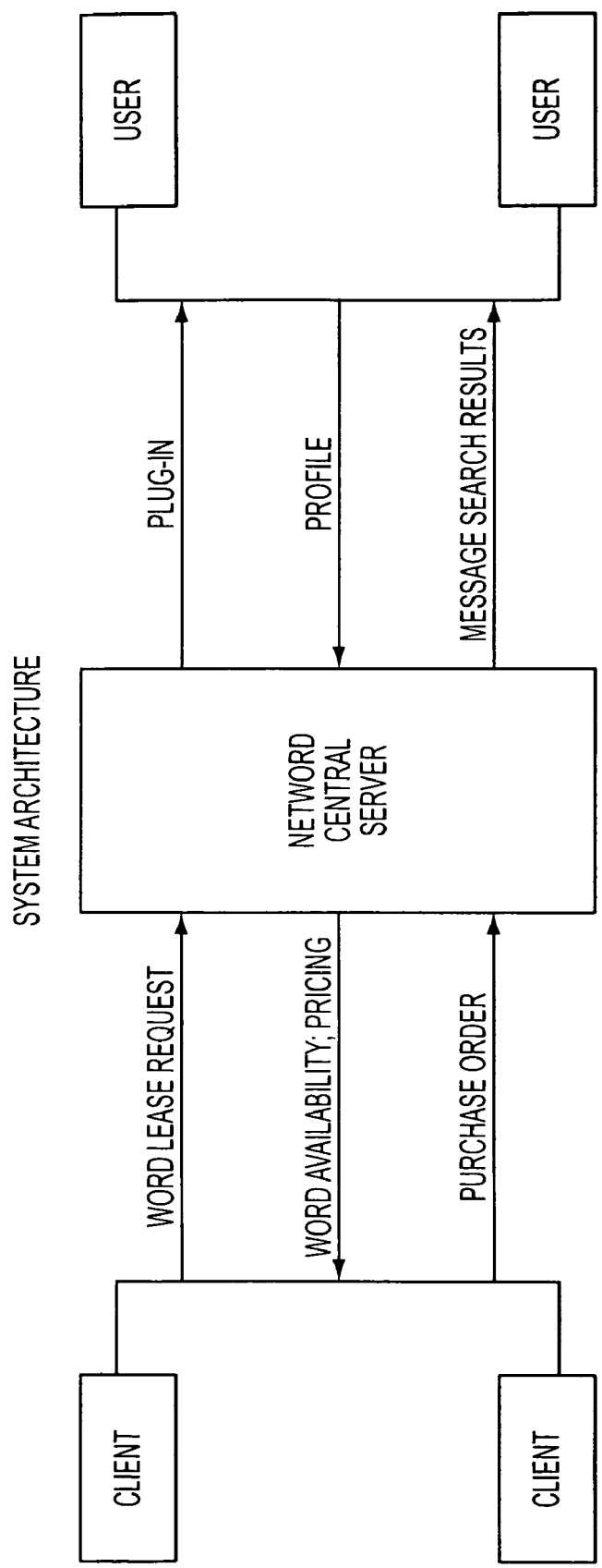
FIG. 7) is a schematic block diagram that illustrates the architecture of the leased word system in relation to the advertiser clients and users, according to an exemplary embodiment of the present invention.
Figure 8:
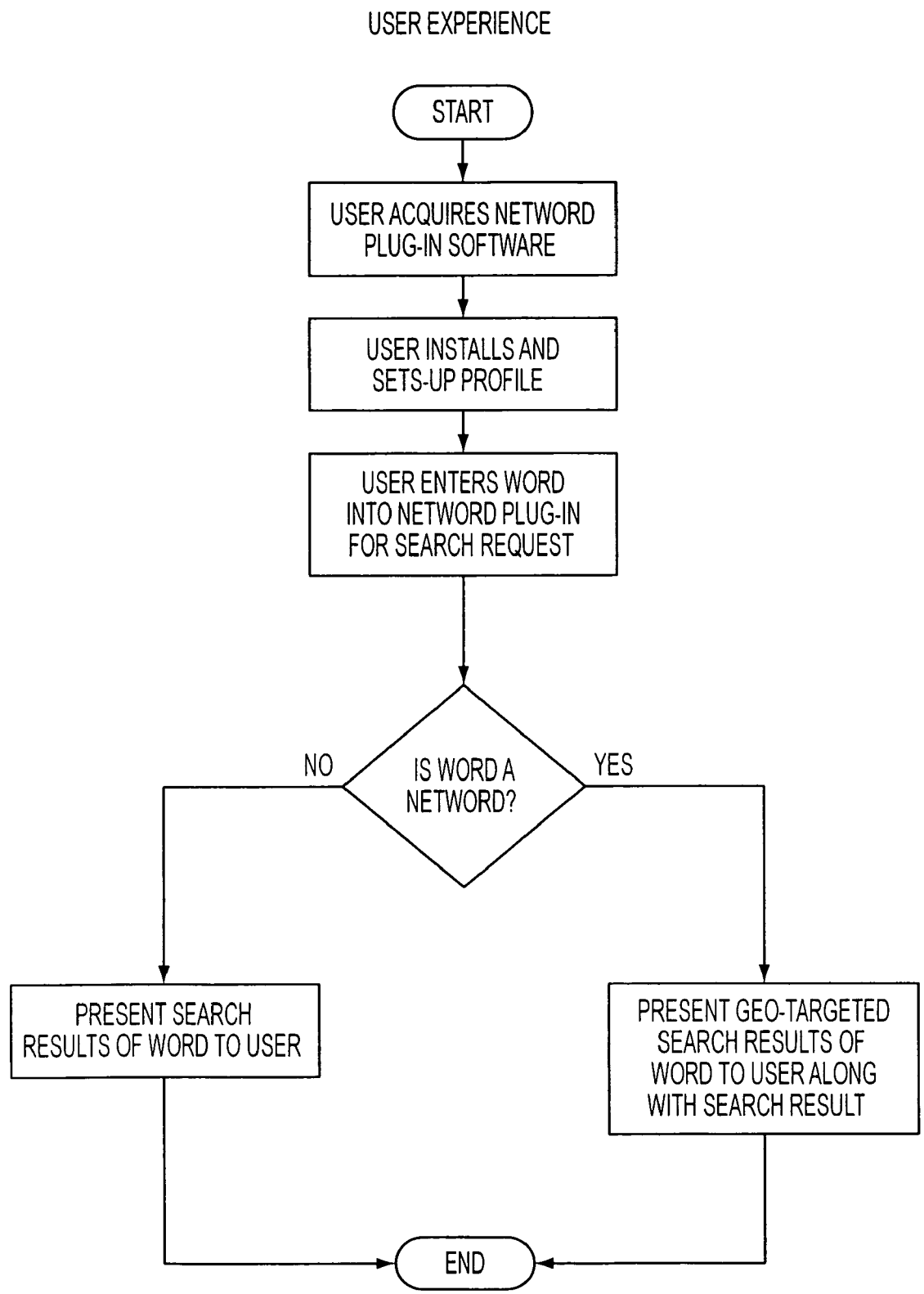
FIG. 8) is a flowchart showing the basic operations of a user's computer, according to an exemplary embodiment of the present invention.
Figure 9:
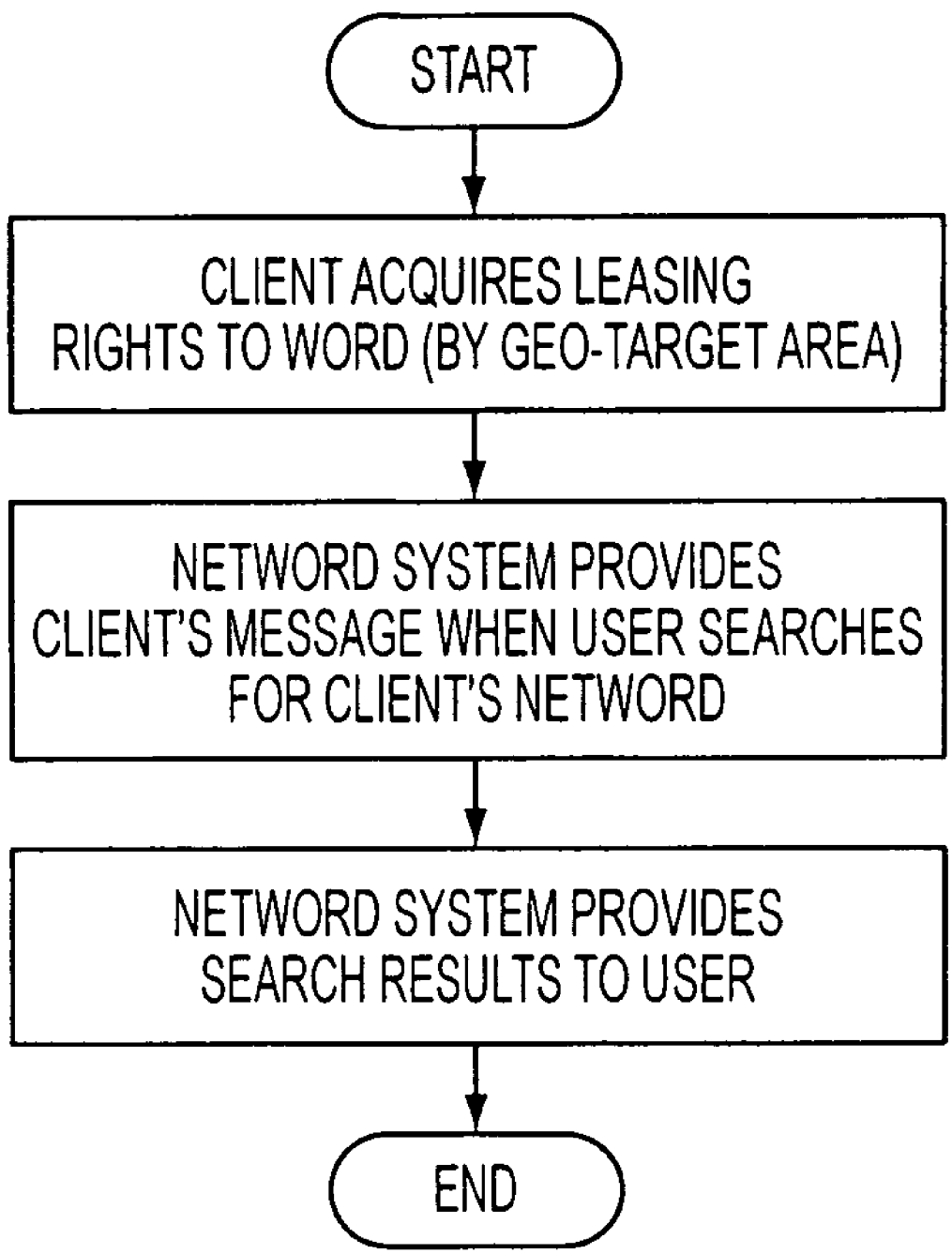
FIG. 9) is a flowchart showing the basic operations of an advertiser client's computer when purchasing a leased word for a geo-targeted area, according to an exemplary embodiment of the present invention.

The Netword™ system ("System") utilizes a Netword™ ("leased term"), as points-of-entry in keyword searches for users of the System. The System then delivers to users both the search results and a message, which relates to the Netword™. Messages can be made available to a user, as seen in FIG. 6, by clients who lease the rights to the Netword™ on an exclusive basis within specific geographic zones, as seen in FIGS. 1b and 2a. The Netword™ may be leased for an unspecified time period or a specified time period. According to exemplary embodiments, a client may be any entity that is interested in leasing a term from the System where the client can be individual, an organization, an information provider and/or an advertiser. For example, an advertiser can be a client that is interested in leasing a word from the System for providing an advertisement. According to exemplary embodiments, a user may be an entity that is using an electronic document (such as a browser) with the System associated with the electronic document. For example, a user can be a computer user that is using an Internet browser (or any electronic document) with a plug-in set-up for searching for words by utilizing the System. A user can enter a keyword into the System (ie., via a toolbar plug-in) and the System will determine if the user's keyword matches a Netword that is stored in the System memory, and if there is a match, then a search result for the user's keyword is presented to the user on at least one platform associated with the Netword along with one or more of the client's message/communication associated with the Netword.

According to exemplary embodiments an electronic document can include a browser (such as any commercially available Internet and Intranet browser), a word processor, an image processor, a pdf viewer and/or any other electronic document capable of presenting textual, graphical and/or audio data to a computer user. A client can be their own lexicographer.

According to exemplary embodiments a word may be one word and/or a phrase comprising a plurality of words, terms and/or letters. The word may or may not appear in a dictionary with a definition. For example, a client may create a word with one or more letters that can serve as the Netword™. A client can be their own lexicographer.

According to exemplary embodiments a keyword may be one word and/or a phrase comprising a plurality of words, terms and/or letters. The keyword may or may not appear in a dictionary with a definition. For example, a client may create a keyword with one or more letters that can serve as the Netword™. A client can be their own lexicographer.

Figure 10:
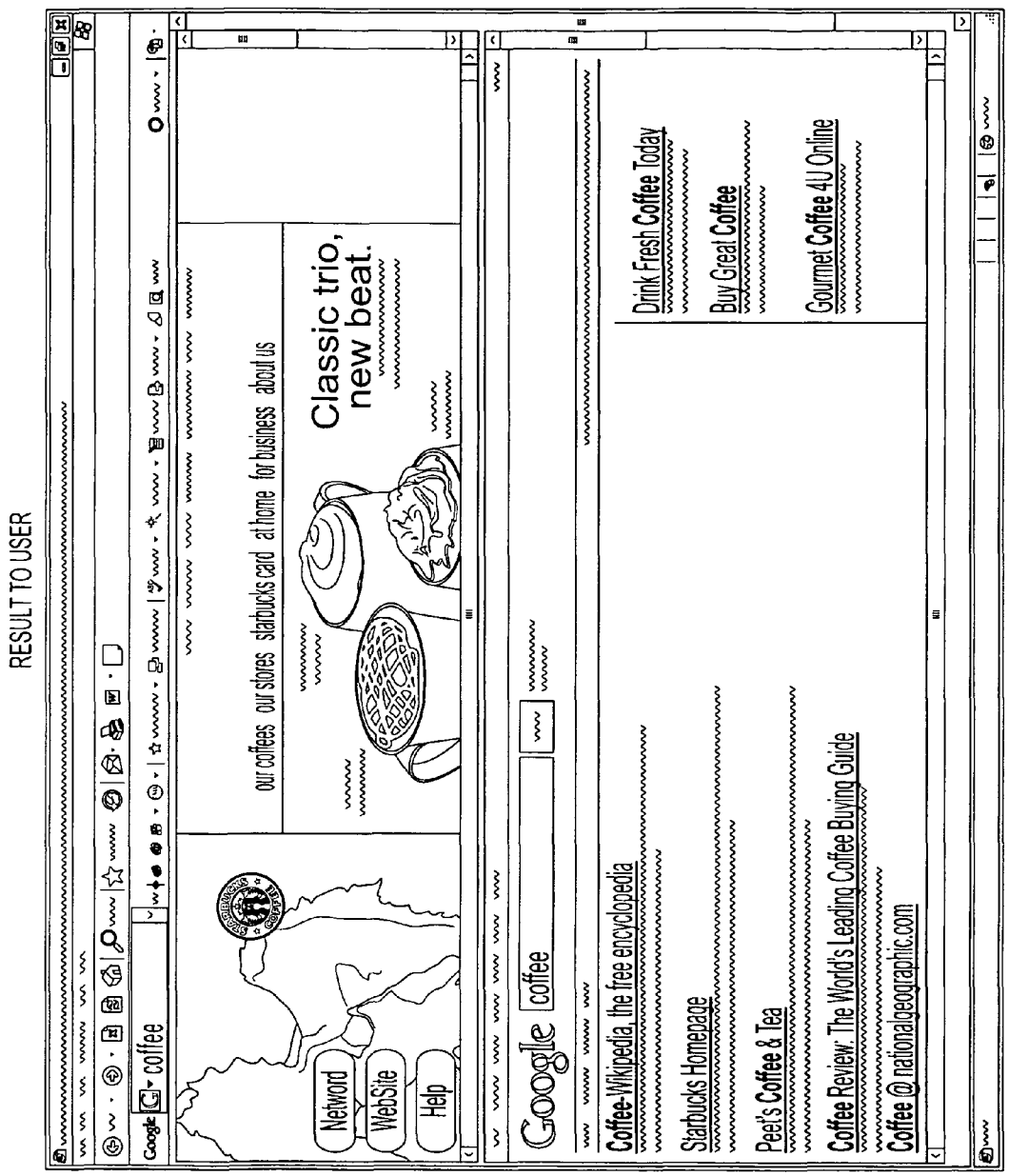
FIG. 10) illustrates a computer generated display of a resolved web page presented to a user after user has entered a keyword/leased word. This provides the user with a unique screen view giving an advertiser client's advertisement in a separate window above the search result for the keyword on the bottom, according to an exemplary embodiment of the present invention.

The System provides clients with the ability to have their specific messages displayed alongside keyword search results for a combination of geo-targeted areas. For example, FIGS. 6 and 10 show exemplary results of when an advertiser leases a Netword™, then the search results are provided to a user in the bottom portion of a browser along with the advertiser's advertisement on the top portion of a browser. According to another embodiment, FIG. 11 shows results of when the advertiser leases a Netword™, then the search results are provided to a user in one browser and the advertisement is provided in a separate browser window.

According to exemplary embodiments, a message can be an object that is linked to another electronic document via a hyperlink. The message can be a version of a web-site of the client, providing similar experience to a user as if the user was using the client's web-site, as shown in FIGS. 6, 10 and 11. The message can be any object (including a graphical, text or non-graphical object) that is linked to another electronic document via a link, as shown in FIGS. 6, 10 and 11. The link can include a hyperlink to another object (for example, a link to another electronic document) and/or a Uniform Resource Locator ("URL") to another file, object or an electronic document. According to an alternative embodiment, the message can be an object (including a graphical, text or non-graphical object) that does not contain any links, as shown in FIG. 13. The message can present any information that the client chooses, including advertising data, current events data and informational data.

Figure 11:
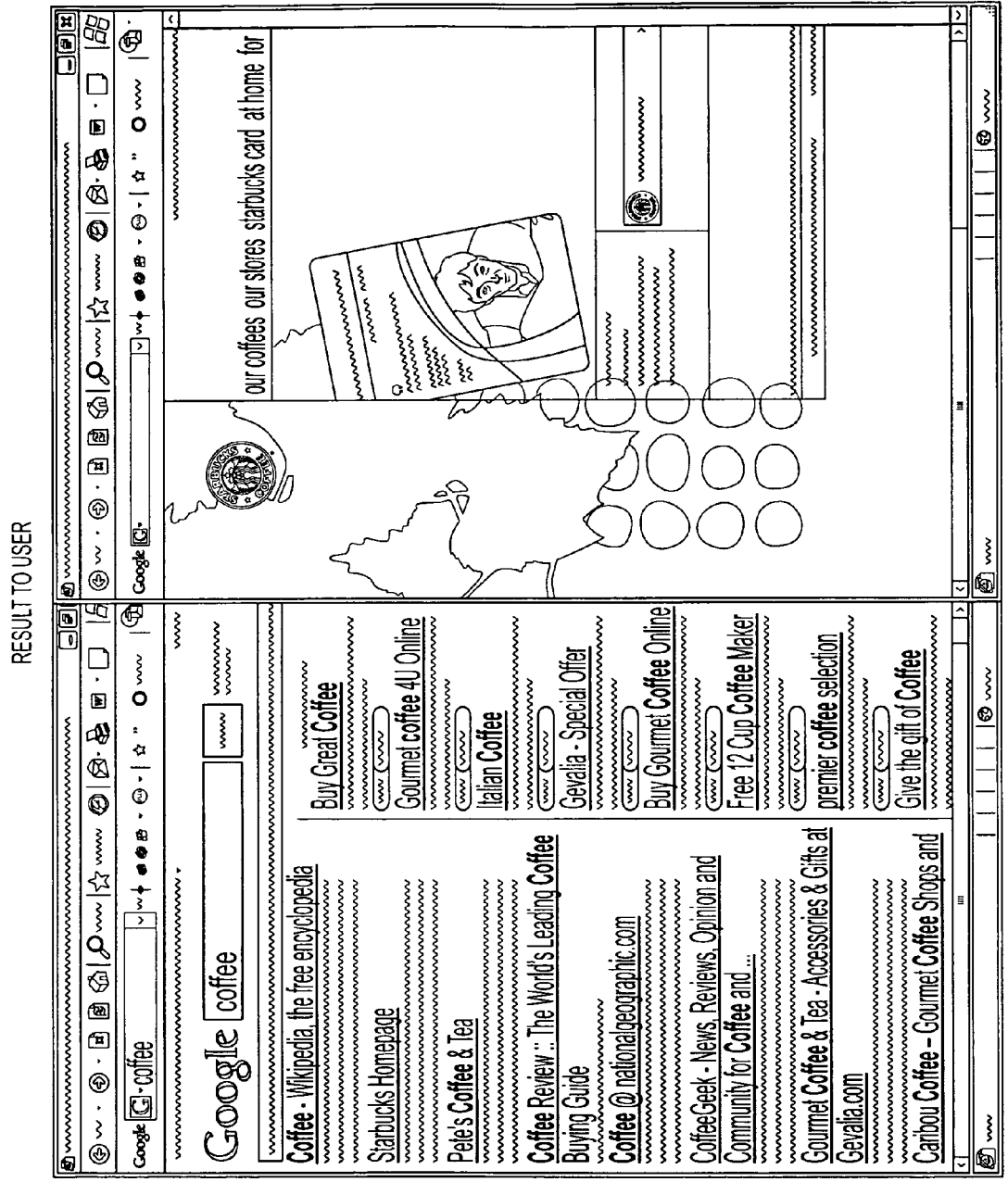
FIG. 11) illustrates a computer generated display of a resolved web page presented to a user after user has entered a keyword/leased word to provide the user with a unique screen view giving an advertiser client's advertisement in a separate browser window than the search result for the keyword, according to an exemplary embodiment of the present invention.
Figure 12:
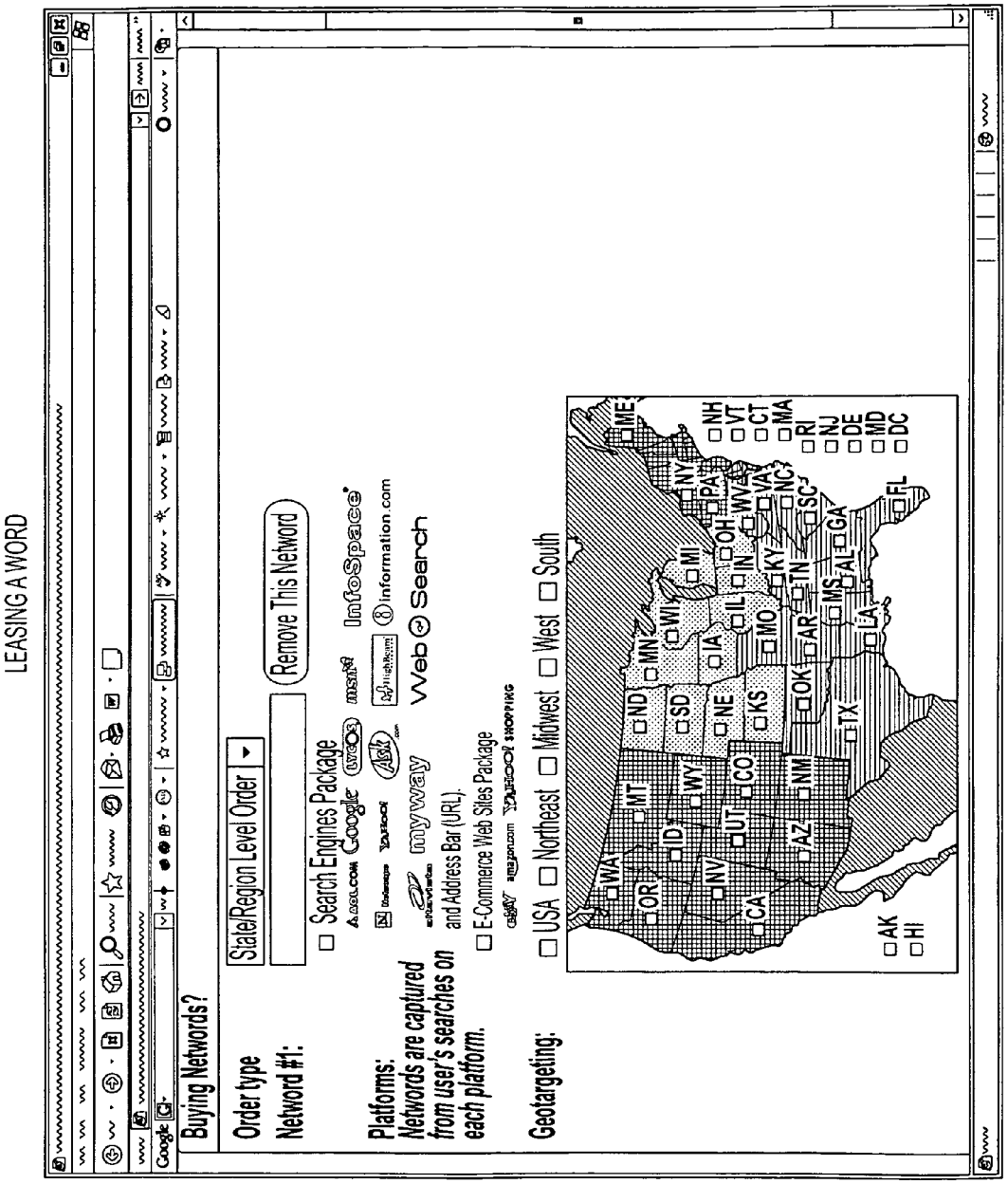
FIG. 12) is a computer generated display showing a selection interface for the starting point for ordering a leased word on a platform for U.S. National, Region, and State level geo-target options for a client according to an exemplary embodiment of the present invention.

For example, in FIGS. 10 and 11, upon the user entering a search request for the Netword™ "coffee" into the System, the System provides the search results to the user along with an advertisement for Starbucks Coffee™. The advertisement presented to the user is Starbucks' web site directly. The user can freely interact with Starbucks' web site as if the user had initiated communication with the web site for Starbucks by entering the URL for Starbucks in an address box of a browser. FIG. 10 shows an example of a zip code level Netword™ search result where the advertisement is presented in the top portion of the browser and the Internet keyword search result is presented on the bottom portion of the browser. FIG. 11 shows an example of a state level Netword™ search result where the advertisement is presented in a first browser window and the search Internet keyword search result is presented in second browser window.

According to another example, as shown in FIG. 13, upon the user entering a search request for the Netword™ "auto upholsterer" into the System, the System provides the search results to the user along with an advertisement/coupon/message for Joey M's Upholsterers. The message presented to the user is not linked to anything else. FIG. 13 also shows a Netword™ search result where the advertisement/coupon/message is presented in a first browser window and the search Internet keyword search result is presented in second browser window.

According to an exemplary embodiment, the System for national, regional and/or state geo-targeting can be augmented to include zip-code for smaller geo-targeting (see FIGS. 1a, 1b, 2a and 2b). The addition of zip-code level geo-targeting (alone or in combination with national, regional and/or state level) allows small and large local clients (such as advertisers) within the System, to take advantage of the Internet to market their message (for example products, services and information) to targeted users who will be the recipient of clients' message (for example, small local businesses can advertise to potential customers in a local zip code). With this System, a client that leases a Netword™ within a specific zip-code (alone or in combination with national, regional and/or state level) will have exclusive rights to associate and distribute their message alongside keyword search results for that zip-code.

Figure 2B:
FIG. 2b) is a computer generated display that shows zip-code options for an Advertiser Client to purchase zip code geo-targets, along with the population within the sample zip codes, according to an exemplary embodiment of the present invention.

As shown in an exemplary embodiment in FIGS. 2a and 2b, the available zip codes are presented to a client at the time of ordering a leased word along with the population in that zip code, from a database where zip code data is periodically updated based on population counts to reflect a change in population, and clients can choose which zip codes they would like to target.

According to exemplary embodiments, the pricing structure for national, regional and state leased words is separate from that of zip-code level leased word. The higher level leased words are priced based upon at least four factors which are co-multiplied, as follows:

1) The selected state, regional, or national geo-target. Factors are determined here based upon population. The larger the population, the higher the factor;

2) Type of search platform or groupings of platforms. Platforms are either search engines (Google, Yahoo, etcetera) or e-commerce websites (E-bay, Yahoo Shopping, etcetera). Factors here are determined based upon search or e-commerce market share;

3) Number of web browser plug-ins downloaded. The more Users who download the plug-in, the higher the factor; and 4) Keyword search popularity. The greater the number of searches nationally per month for a specific keyword, the higher the base price factor for that keyword. This data can pulled from any third party sources that provide statistics for web behavior, for example, www.wordtracker.com and/or www.overtire.com.

According to exemplary embodiments, as shown in FIG. 2c, Zip-code level geo-targeted Networks are priced based upon a pricing tier determined by population within the specific zip code. This information can be pulled from a commercial database which obtains its information from one or more third party sources. For example, the System can obtain information relating to zip codes and population from The U.S. Census Bureau and/or other third party sources.

According to an exemplary embodiment, Networks can leased for certain periods of time, after which then cease being leased words.

Figures 4, 5:
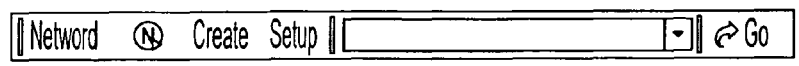
FIG. 4) is a computer generated display showing the leased word web browser plug-in toolbar for a User, according to an exemplary embodiment of the present invention.
FIG. 5) is a computer generated display illustrating profile set-up window for a User to establishes the parameters that govern application of a zip-code level leased word, according to an exemplary embodiment of the present invention.

According to an exemplary embodiment, as shows in FIG. 4, in order for a user to use the System, he or she acquires a web browser plug-in onto his computer. Upon installation of the plug-in, the user inputs a short profile which allows the System to identify the geo-target for the user. For example, as shown in FIG. 5, after successful installation of the plug-in, the user is presented with the Agent Setup window. The user can enter their Postal Code, Country Code, Distance and Language. The System interprets the Postal Code as the user's zip-code. Thereafter, the zip code is identified and associated with the browser of that user's computer until the user changes it. In this example, the System also automatically associates the browser with the geo-targets "California", "Western United States Region", and "U.S. National". After initialization, the user can conduct searches, via the System, on almost any platform (search web site and e-commerce web sites that deliver search results) and additionally resolve clients' messages.

According to exemplary embodiments, as shown in FIGS. 1b and 2a, the System works in conjunction with the identified platform(s) (for example, search engines and e-commerce web sites) capturing search requests from the user and then displaying clients' message (for example, an advertisers' advertisement) along with the user's requested search result. FIGS. 6 and 10 show exemplary results of zip code level Networks where the advertisement is presented in the top portion of the browser and the keyword search result is presented on the bottom portion of the browser. FIG. 11 shows an exemplary result of state level Networks where the advertisement is presented in a first browser window and the keyword search result is presented in a second browser window.

According to exemplary embodiments, the message can either be linked to another file, another electronic document or be a message that contains no links. If the message contains a link, the link can include a hyperlink to another object (for example, a link to another electronic document) and/or a Uniform Resource Locator ("URL") to another file, object or an electronic document. A message can be linked to any object that the client specifies (for example, an advertiser client may link the message to their web site or any other web site) such that users can click on the message and they will be navigated directly to the client's specified web site. Also, the message that is presented to the user can be the client's web site itself or a similar representation of the client's web site such that the message can provide the user with an experience similar to an experience as if the user was presented with the client's web-site itself. For example, as shown in FIGS. 10 and 11, upon the user entering a search request for "coffee" into the System, the System provides the search results to the user along with an advertisement for Starbucks Coffee™. The advertisement presented to the user is the Starbucks' web site directly. The user can freely interact with Starbucks' web site (in the advertisement window) as if the user had initiated communication with the web site for Starbucks. The Netword™ "coffee" is associated, within the System, with the advertisement for Starbucks and anytime a user queries the Netword™ "coffee" within a specified geo-targeted area, they will be presented with the message from Starbucks alongside the search results. FIG. 10 shows exemplary results of zip code level Networks where the advertisement is presented in the top portion of the browser and the Internet keyword search result is presented on the bottom portion of the browser. FIG. 11 shows an exemplary result of state level Networks where the advertisement is presented in a first browser window and the search Internet keyword search result is presented in a second browser window.

Zip-code level geo-targeted (alone or in combination with national, regional and state level) leased word provides the benefit to clients by presenting users with search results along with targeted and highly appropriate message results based upon the zip code associated with the browser, which can be related to the user's geographic location zip code (alone or in combination with national, regional and state level), as shown in FIGS. 6 and 10. The user has the option of entering any zip code they choose using the Agent Set-Up feature, as shown in FIG. 5. For example, the user may physically be located in 90210, but may be interested in seeing results for 20036. In which case, the user can enter 20036 into the Agent Set-up window and the results will be presented with messages that are associated with the zip-code 20036. This provides users, who can be potential customers for the clients, to be delivered highly geo-targeted, maximum value messages.

An aspect of exemplary embodiments of the present invention, as shown in FIGS. 1b, 2c, 3 and 12, is to provide a method for providing exclusive rights to use of a leased word, the method comprising providing an electronic document to a client for placing an order for leasing a word. The method includes receiving a word from a client for leasing, receiving a URL from the client for associating with the word if the client provides a link to associate with the message, presenting a plurality of available geo-target areas to a client, wherein the client can select at least one geo-target area for associating with the word, receiving at least one selected geo-target from the client, presenting one or more platforms to the client for capturing user's searching for a keyword, determining the clients' platform(s) and associating the platform(s) with the word, calculating a pricing structure for leasing the word associated with the selected geo-target areas, determining the availability status of the word, wherein the availability status is either available, lease pending or leased, for the selected geo-target area, displaying the availability status and a price structure of the word associated with the selected geo-target areas, displaying a purchase order status to an advertiser for the word associated with the selected geo-target areas, receiving a purchase order from a client for leasing the available word in the selected geo-target area, storing a relationship for the leased word with the selected geo-target areas, and updating the availability status of the leased word.

According to exemplary embodiments, if the System does not find an advertiser client that matches a keyword, then the plug-in expands the single search result window without a message and presents the search result to the user.

According to an exemplary embodiment, to setup the System, the user enters the word leasing entity web site Uniform Resource Locator ("http://www.netword.com">) into the address block of a browser, download and install a plug-in for a supported browser by downloading the corresponding installation package. Alternatively, the plug-in for using the System may also be provided to the user using compact discs, floppy disks, flash memory devices and/or any other device or channels for distributing software to a user (it is contemplated that broader, additional distribution channels may be used for acquiring the plug-in software). The plug-in for using the System may also be pre-installed onto a user's computer. The System, when running on a user's browser, as shown in FIG. 4, allows the altering of location settings for the plug-in, using a set-up window, as shown in FIG. 5. These settings include, but are not limited to, postal code (which can be interpreted by the System as zip code), country code, distance and language, for setting the user's geo-target.

According to exemplary embodiments, the function of the plug-in is to track the moment when a user retrieves data on the Internet using certain search engines or commercial web sites and, on the basis of target data, to return additional results from the Advertiser web site. The leased word plug-in system takes advantage of certain technologies. For example, for the Internet Explorer browser, leased word uses ActiveX, COM and XML. For the Mozilla browser, leased word uses Framework "Wise", Dynamic HTML and CPDF library. The plug-in interfaces for all supported browsers and/or electronic documents can be similar.

According to an exemplary embodiment of the present invention, FIG. 3 illustrates a Netword™ order status describing a summary of a leased word purchase order for an advertiser. The order status illustrates a purchase order presented to the advertiser for the Netword™ associated with the selected geo-target areas and the selected platforms. The order status also illustrates the price of the leased word with the selected geo-target areas and platforms, along with the total for the order.

The above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, et and so on, including a carrier wave transmitting signals specifying the program instructions, data structures, et and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for providing geo-targeted messages with a search result, the method comprising:
   providing a toolbar plug-in for an electronic document for allowing a user to enter a search query term for querying the search query term on at least one Internet search platform;
   customizing the toolbar plug-in with at least one geographical setting;
   providing exclusive leasing rights to use a leased term associated with a message, wherein the leased term exclusively corresponds to at least one selected geo-targeted area;
   saving the leased term;
   receiving a search query term, via the toolbar plug-in, for performing a search request for the search query term on said search platform(s);
   displaying the search result for the search query term in a second electronic document; and
   displaying at least one geo-targeted message corresponding to the leased term in response to the search request in a first electronic document, upon determining that the search query term matches the leased term,
   wherein the method simultaneously provides for displaying the geo-targeted messages in the first electronic document, and displaying said search result in the second electronic document,
   wherein the first electronic document and the second electronic document are independent, and
   wherein providing exclusive leasing rights to use the leased term comprises removing the search query term from the terms available for lease in the at least one selected geo-targeted area.

2. The method of claim 1, wherein providing a toolbar plug-in comprises:
   acquiring the toolbar plug-in onto the user's computer; and
   installing the toolbar plug-in on the electronic document for allowing the user to enter a search query term for a search request.

3. The method of claim 1, wherein customizing comprises:
   initializing a profile comprising inputting geographic information; and
   saving the initialized profile to a memory for automatically identifying the geographic information.

4. The method of claim 1, wherein providing exclusive leasing rights comprises
   receiving the leased term;
   receiving a URL for associating with the leased term if a link is provided to associate with the message;
   presenting a selectable selection of available geo-target areas for associating with the leased term;
   receiving at least one geo-target selection;
   presenting a selectable selection of the Internet search platform(s);
   receiving selected platform(s);
   calculating a pricing structure for leasing the leased term associated with the selected geo-target areas and said selected search platform;
   determining the availability status of the leased term, where the availability status is either available, lease pending or leased, for the selected geo-target area;
   displaying the availability status and a price structure of the leased term associated with the selected geo-target areas;
   displaying a order summary for the leased term associated with the selected geo-target areas;
   receiving a purchase order for leasing the available leased term in the selected geo-target area;
   storing a relationship for the leased term with the selected geo-target areas; and
   updating the availability status of the leased term.

5. The method of claim 4, wherein calculating the pricing structure comprises co-multiplying factors, wherein the factors comprise a weight factor for the geo-targets selected, a factor for the selected platforms, a factor for the number of times the plug-in has been downloaded within a given time period and a factor for the leased term popularity.

6. The method of claim 5, wherein the weight factor for the geo-targets is based upon population, wherein, the larger the population, the higher the factor.

7. The method of claim 5, wherein the factor for the platform selected is based upon a search engine or electronic commerce market share.

8. The method of claim 5, wherein the leased term popularity factor is based on the number of searches performed nationally per month for the leased term, wherein, the greater the number of searches performed nationally, the higher the base price factor for that keyword.

9. The method of claim 1, wherein the geo-target area comprises at least one of national, regional, state and zip code level geo-targeting.

10. The method of claim 9, wherein the geo-targeted area comprises zip code level geo-targeting, wherein the available zip code data is periodically updated to reflect a change in population.

11. The method of claim 1, wherein determining if the search query term matches a leased term comprises comparing the search query term with the saved leased term and indicating when a match is found.

12. The method of claim 1, wherein displaying a search result comprises displaying a search results for the search query term.

13. The method of claim 1, wherein the geo-targeted message comprises a link.

14. The method of claim 1, wherein providing exclusive leasing rights to use a leased term further comprises presenting a selection of one or more platforms for capturing a user's search.

15. The method of claim 1, wherein when the selected geo-targeted area is at least one of national, regional and state, then presenting platform(s) selection options for at least one of a search engine package and electronic commerce package.

16. The method of claim 1, wherein when the selected geo-targeted area is zip code, then presenting platform(s) selection options for at least one a search engine and electronic commerce.

17. A method for providing exclusive rights to use of a leased term, the method comprising:
    receiving a URL for associating with the leased term if a link is provided to associate with the message;
    presenting a selectable selection of available selectable geo-target areas for associating with the leased term;
    receiving at least one selected geo-targeted area;
    presenting a selectable selection of Internet search platforms;
    determining the selected platform(s) and associating said selected platform(s) with the leased term;
    calculating a pricing structure for leasing the leased term associated with the selected geo-target areas and said selected search platform(s);
    determining the availability status of the leased term, wherein the availability status is either available, lease pending or leased, for the selected geo-target area;
    displaying the availability status and a price structure of the leased term associated with the selected geo-target areas;
    displaying a purchase order status for the leased term associated with the selected geo-target areas;
    receiving a purchase order for leasing the available leased term in the selected geo-target area;
    storing a relationship for the leased term with the selected geo-target areas; and
    updating the availability status of the leased term,
    wherein providing exclusive leasing rights to use of the leased term comprises removing the search query term from the terms available for lease in the at least one selected geo-targeted area.

18. The method of claim 17, wherein calculating a pricing structure comprises co-multiplying a weight factor for the selected geo-targeted area(s), a factor for the selected platform(s), a number of times the browser plug-in has been downloaded within a given time period and a leased term popularity factor.

19. The method of claim 18, wherein the geo-targeted area(s) comprises at least one of national, regional, state and/or zip code level geo-targeting.

20. A computer readable medium having stored thereon executable instructions for providing geo-targeted-messages with a search result, the instructions comprising:
    a first set of instructions for providing a toolbar plug-in for an electronic document for allowing a user to enter a search query term for querying the search query term on at least one Internet search platform;
    a second set of instructions for customizing the toolbar plug-in with at least one geographical setting;
    a third set of instructions for providing exclusive leasing rights to use a leased term associated with a message, wherein the leased term exclusively corresponds to at least one selected geo-targeted area;
    a fourth set of instructions for saving the leased term;
    a fifth set of instructions for receiving a search query term via the toolbar plug-in on said search platform(s);
    a sixth set of instructions for displaying the search result for the search query term in a second electronic document; and
    an seventh set of instructions for displaying at least one geo-targeted message corresponding to the leased term in response to the search request in a first electronic document, upon determining that the search query term matches the leased term,
    wherein the computer readable medium simultaneously provides for displaying the geo-targeted messages in the first electronic document, and displaying said search result in the second electronic document, and
    wherein providing exclusive leasing rights to use the leased term comprises removing the search query term from the terms available for lease in the at least one selected geo-targeted area.

21. A computer readable medium having stored thereon executable instructions for providing exclusive rights to use of a leased term, the method comprising:
    a first set of instructions for receiving the leased term;
    a second set of instructions for receiving a URL from the client for associating with the leased term a link is provided to associate with the message;
    a third set of instructions for presenting a selectable selection of available geo-target areas for associating with the leased term;
    a fourth set of instructions for receiving at least one selected geo-target;
    a fifth set of instructions for presenting a selectable selection of the Internet search platforms;
    a sixth set of instructions for receiving selected platform(s) and associating the platform(s) with the leased term;
    a seventh set of instructions for calculating a pricing structure for leasing the leased term associated with the selected geo-target areas and said selected search platform(s);

an eighth set of instructions for determining the availability status of the leased term, wherein the availability status is either available, lease pending or leased, for the selected geo-target area;
a ninth set of instructions for displaying the availability status and a price structure of the leased term associated with the selected geo-target areas;
a tenth set of instructions for displaying a purchase order status for the leased term associated with the selected geo-target areas;
an eleventh set of instructions for receiving a purchase order for leasing the available leased term in the selected geo-target area;
a twelfth set of instructions for storing a relationship for the leased term with the selected geo-target areas; and
a thirteenth updating the availability status of the leased term,
wherein providing exclusive leasing rights to use of the leased term comprises removing the search query term from the terms available for lease in the at least one selected geo-targeted area.

22. The method of claim 1, wherein the first electronic document presents a first Internet result, and the second electronic document presents a second Internet result.

23. The computer readable medium of claim 20, wherein the first electronic document presents a first Internet result, and the second electronic document presents a second Internet result.

* * * * *